(12) United States Patent
Han et al.

(10) Patent No.: US 10,901,246 B2
(45) Date of Patent: Jan. 26, 2021

(54) OPTICAL PHASE SHIFTER AND OPTICAL SWITCH DEVICE USING FERROELECTRIC MATERIAL

(71) Applicant: KOREA INSTITUTE OF SCIENCE AND TECHNOLOGY, Seoul (KR)

(72) Inventors: Jae-Hoon Han, Seoul (KR); Sanghyeon Kim, Seoul (KR); Pavlo Bidenko, Seoul (KR); Subin Lee, Seoul (KR); Jin-Dong Song, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/528,633

(22) Filed: Aug. 1, 2019

(65) Prior Publication Data
US 2020/0041825 A1 Feb. 6, 2020

(30) Foreign Application Priority Data

Aug. 3, 2018 (KR) .................... 10-2018-0090707

(51) Int. Cl.
*G02F 1/05* (2006.01)
*G02F 1/025* (2006.01)

(52) U.S. Cl.
CPC ............ *G02F 1/0508* (2013.01); *G02F 1/025* (2013.01); *G02F 1/0516* (2013.01)

(58) Field of Classification Search
CPC ....... G02F 1/025; G02F 1/0508; G02F 1/0516
See application file for complete search history.

(56) References Cited

U.S. PATENT DOCUMENTS 7,924,492 B2 * 4/2011 Kim ................. G02F 1/025
359/248
8,300,990 B2 * 10/2012 Li ................... G02B 6/12002
359/245
(Continued)

FOREIGN PATENT DOCUMENTS

JP 4820649 B2 11/2011
JP 5773410 B2 9/2015
(Continued)

OTHER PUBLICATIONS

Asif Islam Khan, "Negative Capacitance for Ultra-low Power Computing," Doctoral thesis in University of California at Berkeley, 2015, 167 pages.
(Continued)

*Primary Examiner* — Daniel Petkovsek
(74) *Attorney, Agent, or Firm* — Cantor Colburn LLP

(57) ABSTRACT

An optical phase shifter according to an embodiment for achieving the object of the present disclosure includes a first semiconductor layer formed on a substrate, a second semiconductor layer having opposite polarity to the first semiconductor layer, an insulating layer formed between the first semiconductor layer and the second semiconductor layer, and including ferroelectrics, a first electrode connected to the first semiconductor layer, and a second electrode connected to the second semiconductor layer. According to an
(Continued)

embodiment, the introduction of ferroelectric materials to a semiconductor-insulator-semiconductor (SIS) optical phase shifter brings about improvement in charge collection efficiency resulting from the negative capacitance effect, thereby achieving higher phase modulation efficiency and lower power consumption. Additionally, it is possible to realize a new structure of optical switch or modulator device through design changes of the type of ferroelectrics and the structural variables.

12 Claims, 18 Drawing Sheets

(56) References Cited

U.S. PATENT DOCUMENTS

| | | | | |
|---|---|---|---|---|
| 8,467,632 | B2* | 6/2013 | Zheng | G02F 1/025 385/1 |
| 2011/0255823 | A1 | 10/2011 | Li et al. | |
| 2012/0321240 | A1 | 12/2012 | Alloatti et al. | |
| 2014/0036335 | A1* | 2/2014 | Bouvrot | G02F 1/01 359/245 |
| 2016/0048041 | A1* | 2/2016 | Cunningham | G02F 1/0508 385/2 |
| 2018/0081204 | A1* | 3/2018 | Ma | G02F 1/225 |

FOREIGN PATENT DOCUMENTS

| | | |
|---|---|---|
| KR | 1020150006419 A | 1/2015 |
| SG | 173939 A1 | 9/2011 |
| WO | 2004088394 A2 | 10/2004 |
| WO | 2013165376 A1 | 11/2013 |

OTHER PUBLICATIONS

Jae-Hoon Han et al., "Efficient low-loss InGaAsP/Si hybrid MOS optical modulator," Nature Photonics, Jul. 24, 2017, pp. 486-490, vol. 11.

Jianfeng Ding et al., "Electro-Optical Response Analysis of a 40 Gb/s Silicon Mach-Zehnder Optical Modulator," Journal of Lightwave Technology, 2013, pp. 2434-2440, vol. 31, No. 14.

Mitsuru Takenaka et al., "Strain Engineering of Plasma Dispersion Effect for SiGe Optical Modulators," IEEE Journal of Quantum Electronics, Jan. 2012, pp. 8-16, vol. 48, No. 1.

Tom Baehr-Jones et al., "Ultralow drive voltage silicon traveling-wave modulator," Optics Express, May 11, 2012, pp. 12014-12020, vol. 20, No. 11.

Younghyun Kim et al., "Strain-induced enhancement of plasma dispersion effect and free-carrier absorption in SiGe optical modulators," Scientific Reports, Apr. 15, 2014, pp. 1-6, vol. 4, No. 4683.

* cited by examiner

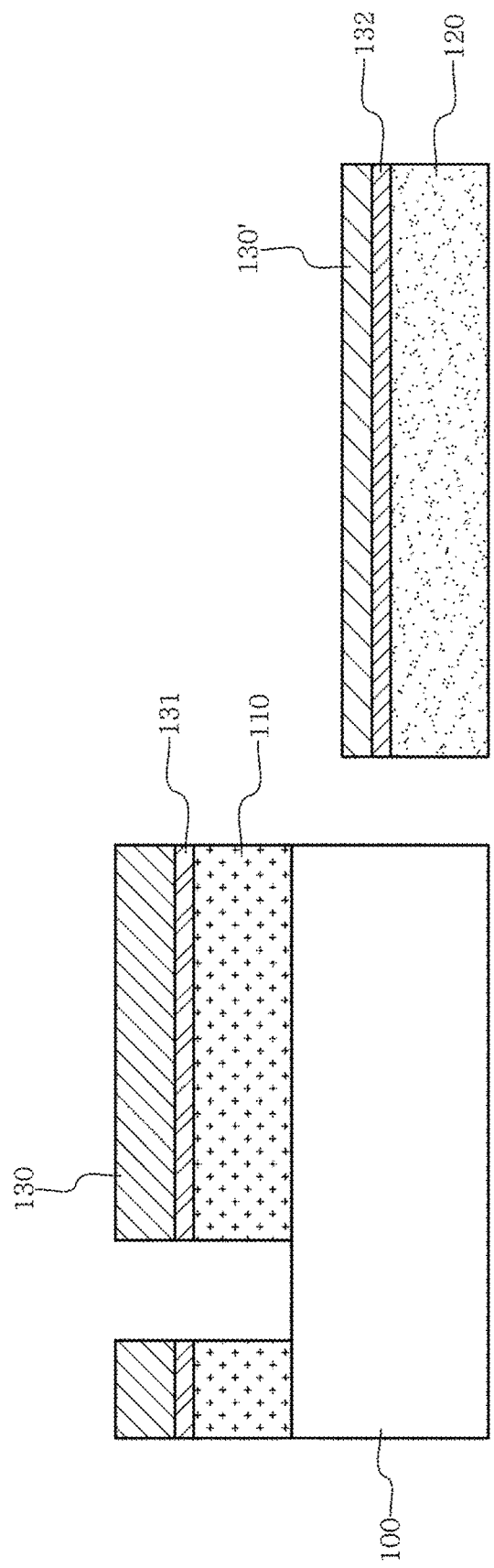

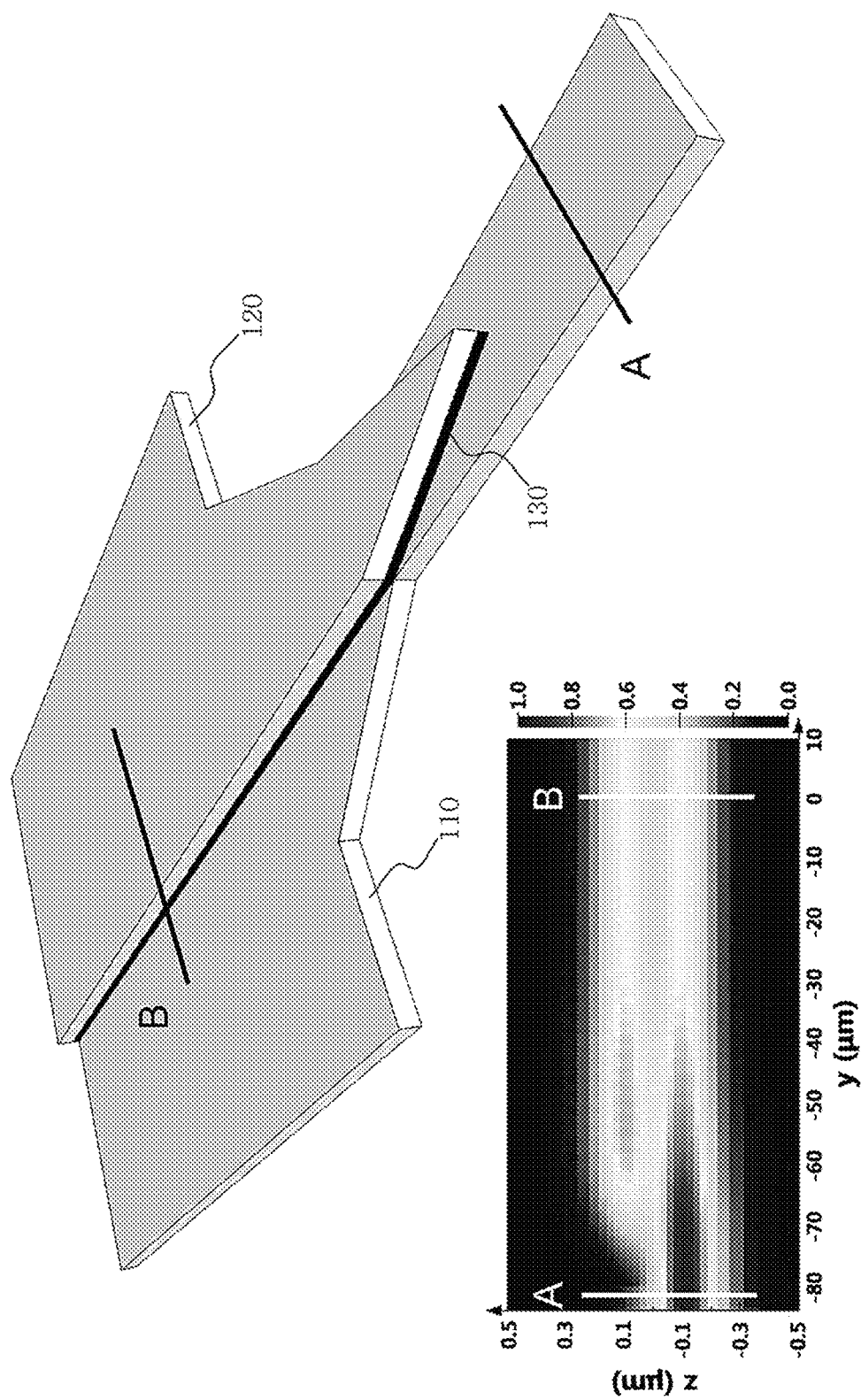

OPTICAL PHASE SHIFTER AND OPTICAL SWITCH DEVICE USING FERROELECTRIC MATERIAL

CROSS-REFERENCE TO RELATED APPLICATION

This application claims priority to Korean Patent Application No. 10-2018-0090707, filed on Aug. 3, 2018, and all the benefits accruing therefrom under 35 U.S.C. § 119, the contents of which in its entirety are herein incorporated by reference.

BACKGROUND

1. Field

The present disclosure relates to an optical phase shifter and an optical switch device, and more particularly, to an optical phase shifter and an optical switch device with improved optical modulation performance and reduced power consumption by introducing ferroelectric materials to an insulator of an optical device with a semiconductor-insulator-semiconductor (SIS) structure.

2. Description of the Related Art

The existing circuit for long-distance optical communication is formed using each respective device (light modulators, lasers, photodetectors, optical fibers, etc.) using compound semiconductors, and is a disadvantageous structure in terms of high integration, low cost and mass production. Recently, with the development of Si photonics technology, many studies are being made on opto-electronic integrated circuits (OEICs) which incorporate optical and electronic devices into one. This technology attracts much attention because it can realize optical circuits with high integration, low cost and mass production, and is expected to be used in a wide range of applications including data transmission in the data center, optical sensors and optical wiring technology for integrated circuits. Si photonics for large-scale optical integrated circuits can form optical circuits using high performance passive devices, by using silicon-on-insulator (SOI)-based optical waveguides for exploiting a large refractive index difference between silicon and oxide (primarily, $SiO_2$) as a basic component. However, low performance of active devices caused by low photoelectric conversion characteristics of Si is an obstacle to commercialization.

In this context, an optical phase shifter is a device used to modulate an electrical signal to an optical signal, and high operating voltage and large device size caused by low photoelectric conversion characteristics of Si make it difficult to manufacture high performance and high integration devices. Recently, technology was suggested to improve modulation efficiency by inducing the accumulation of charge at the center of an MOS capacitor near an optical waveguide to change the refractive index of the optical waveguide, causing the phase shift of light to modulate light, but does not overcome the limitation of Si. More recently, to solve this problem, a hybrid semiconductor-insulator-semiconductor (SIS) optical phase shifter was developed, in which an SIS capacitor is fabricated by bonding an insulating layer of an SOI substrate with group III-V semiconductors having good optical properties instead of silicon, and it gains much attention as technology that can achieve high efficiency and low power consumption at the same time.

However, these studies mainly concentrate on semiconductors that constitute an SIS device, and there is no study on functionality impartment into an insulator other than scaling of an insulator that is another component of the SIS structure.

SUMMARY

The present disclosure is directed to providing a semiconductor-insulator-semiconductor (SIS) optical phase shifter with higher phase modulation efficiency and lower power consumption by introducing ferroelectric materials as a constituent material of an insulator, with paying attention to the characteristics of the insulator, not the characteristics of semiconductors.

The present disclosure is further directed to providing an SIS ultra-low power optical switch or modulator device using the memory effect or negative capacitance effect of ferroelectrics.

To achieve the objects of the present disclosure, an optical phase shifter according to an embodiment includes a first semiconductor layer formed on a substrate, a second semiconductor layer having opposite polarity to the first semiconductor layer, an insulating layer formed between the first semiconductor layer and the second semiconductor layer, and including ferroelectrics, a first electrode connected to the first semiconductor layer, and a second electrode connected to the second semiconductor layer.

In an embodiment, the ferroelectrics may include at least one of material with high permittivity (high-k material) doped with a metal element or having an adjusted thickness to have ferroelectric properties, Perovskite dielectrics, and organics having ferroelectric properties.

In an embodiment, the ferroelectrics may include at least one of a high-k material such as $Al_2O_3$, $HfO_2$, $La_2O_3$ and $Y_2O_3$, doped with a metal element to have ferroelectric properties, such as Y-doped $HfO_2$, Si-doped $HfO_2$, Al-doped $HfO_2$, Sr-doped $HfO_2$, Gd-doped $HfO_2$, La-doped $HfO_2$ and $HfZrO_2$, Perovskite dielectrics such as PZT and $BaTiO_3$, and organics having ferroelectric properties such as PVDF-TrFE.

In an embodiment, the insulating layer may further include paraelectrics.

In an embodiment, a ratio between the ferroelectrics and the paraelectrics included in the insulating layer may determine the presence or absence of hysteresis in electrical properties of an optical phase interferometer, or may determine charge collection efficiency.

In an embodiment, the thickness of the insulating layer may be smaller than the thickness of the first semiconductor layer and the second semiconductor layer, and determine an intensity of focused light.

There may be provided an optical interferometer including the optical phase shifter according to the embodiments.

A hybrid structure of an optical phase shifter with a ferroelectric capacitor according to an embodiment includes a first semiconductor layer formed on a substrate, a second semiconductor layer having opposite polarity to the first semiconductor layer, an insulating layer formed between the first semiconductor layer and the second semiconductor layer, a first electrode connected to the first semiconductor layer, a second electrode connected to the second semiconductor layer, a capacitor connected to the first electrode or the second electrode, and including ferroelectrics, and a circuit for charging the capacitor.

A method for manufacturing an optical phase shifter according to an embodiment includes providing a first semiconductor layer formed on a substrate and a second semiconductor layer having opposite polarity to the first semiconductor layer, processing the first semiconductor layer to form an optical waveguide, forming an oxide layer and a ferroelectric layer on each of surfaces of the first semiconductor layer and the second semiconductor layer, bonding the ferroelectric layer of the first semiconductor layer and the ferroelectric layer of the second semiconductor layer together, processing the second semiconductor layer to form a hybrid structure of the optical waveguide with a taper causing light to travel from the optical waveguide of the first semiconductor layer to the second semiconductor layer, and forming an upper cladding and an electrode on the first semiconductor layer and the second semiconductor layer.

A method for manufacturing an optical phase shifter according to another embodiment includes forming a first semiconductor layer on a substrate, processing the first semiconductor layer to form an optical waveguide, forming an oxide layer and a ferroelectric layer on the first semiconductor layer, forming a second semiconductor layer having opposite polarity to the first semiconductor layer on the oxide layer, processing the second semiconductor layer to form a hybrid structure of the optical waveguide with a taper causing light to travel from the optical waveguide of the first semiconductor layer to the second semiconductor layer, and forming an upper cladding and an electrode on the first semiconductor layer and the second semiconductor layer.

A method for manufacturing an optical phase shifter according to still another embodiment includes forming a first semiconductor layer on a substrate, processing the first semiconductor layer to form an optical waveguide, forming an oxide layer on a surface of the first semiconductor layer, forming a second semiconductor layer having opposite polarity to the first semiconductor layer on the oxide layer, processing the second semiconductor layer to form a hybrid structure of the optical waveguide with a taper causing light to travel from the optical waveguide of the first semiconductor layer to the second semiconductor layer, forming an upper cladding and an electrode on the first semiconductor layer and the second semiconductor layer, connecting a capacitor including ferroelectrics to the electrode, and connecting a circuit for charging the capacitor.

According to an embodiment of the present disclosure, the introduction of ferroelectric materials to an SIS optical phase shifter brings about improvement in charge collection efficiency resulting from the negative capacitance effect, thereby achieving higher phase modulation efficiency and lower power consumption. Additionally, it is possible to realize an ultra-low power optical switch device using the memory effect of ferroelectrics through design changes of the type of ferroelectrics and the structural variables.

Further, the technical spirit of the present disclosure may be applied to the design of active devices such as hybrid SIS structures or hybrid lasers using group III-V semiconductors by introducing ferroelectrics to an insulator, and thus it is possible to take advantages of silicon and III-V semiconductors at the same time. Accordingly, it is possible to dramatically improve the performance of silicon photonics now at a standstill, and present a universal platform that is easily compatible with the existing technology and equipment.

BRIEF DESCRIPTION OF THE DRAWINGS

FIGS. 7A to 7E are diagrams showing a method for manufacturing an optical phase shifter according to an embodiment.

FIG. 9 is a diagram showing a hybrid structure of an optical waveguide with a taper in an optical phase shifter according to an embodiment.

DETAILED DESCRIPTION

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled.

Hereinafter, the embodiments of the present disclosure will be described in detail with reference to the accompanying drawings.

Figure 1:
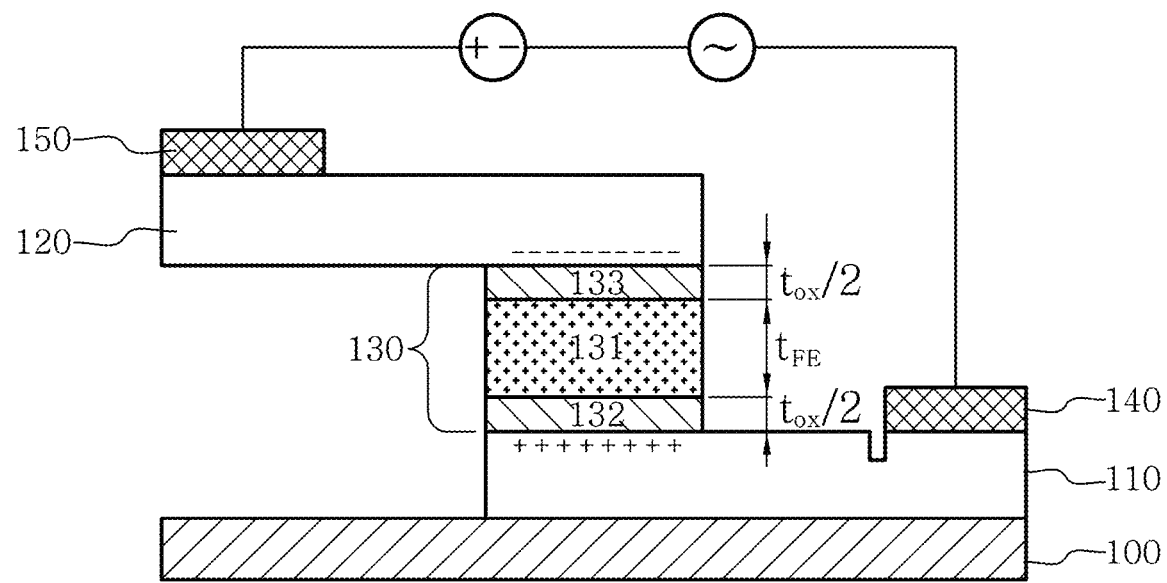
FIG. 1 is a cross-sectional view of an optical phase shifter using ferroelectrics according to an embodiment.

FIG. 1 is a cross-sectional view showing the structure of an optical phase shifter according to an embodiment. The optical phase shifter is a unit device of a light modulator or a switch used to modulate a light carrier to an analog or digital signal, and modulates the phase of a light beam by inducing the accumulation of charge at the center of an MOS capacitor near an optical waveguide to change the refractive index of the optical waveguide.

Referring to FIG. 1, the optical phase shifter includes a substrate 100, a first semiconductor layer 110 formed on the substrate, a second semiconductor layer 120 having the opposite polarity to the first semiconductor layer, an insulating layer 130 including ferroelectrics, formed between the first semiconductor layer 110 and the second semiconductor layer 120, and a first electrode 140 and a second electrode 150 electrically connected to the first and second semiconductor layers 110, 120, respectively.

In an embodiment, the insulating layer 130 may include a ferroelectric layer 131, and may further include paraelectric layers 132, 133. However, one of the paraelectric layers 131, 132 or both may be excluded from or added to the structure as necessary according to the design.

The substrate 100 is a component for supporting the semiconductor layer and the remaining components. The constituent material of the substrate is not limited to a particular type, but may include, for example, compound semiconductors such as monocrystalline silicon (Si), germanium (Ge), silicon germanium (SiGe), gallium arsenide (GaAs), indium arsenide (InAs), indium phosphide (InP), or their compounds. In an embodiment, the substrate 100 may have a silicon on insulator (SOI) structure, or may further include a buried oxide layer.

The first semiconductor layer 110 is formed on the substrate 100. The constituent material of the first semiconductor layer 110 is not limited to a particular type, but may include, for example, compound semiconductors such as monocrystalline silicon (Si), germanium (Ge), silicon germanium (SiGe), gallium arsenide (GaAs), indium arsenide (InAs) indium phosphide (InP) or their compounds.

The first semiconductor layer 110 includes a core in which light is confined. The core may be made of semiconductors primarily used in the existing optical transmission platform, including group IV semiconductors such as silicon (Si), germanium (Ge), tin (Sn), or their compounds such as silicon germanium alloy (SiGe), germanium tin alloy (GeSn), binary compound semiconductors such as InP, InAs, GaAs, GaSb and their compounds including ternary and quaternary compound semiconductors. The core may be made of a material that has transparent properties in the wide infrared wavelength range of 1 µm to 15 µm including about 1.3 µm wavelength or about 1.55 µm wavelength which is in the communication wavelength range.

The second semiconductor layer 120 and the first semiconductor layer 110 have opposite polarities, and for example, the first semiconductor layer may be positively (+) doped and the second semiconductor layer may be negatively (−) doped, or vice versa. In an embodiment, the first semiconductor layer 110 includes a positively (+) doped material (for example, p-Si), the second semiconductor layer 120 includes a negatively (−) doped material (for example, n-Si), and a carrier such as an electron or a hole is injected by each of the arranged electrodes 140, 150 to change the refractive index of light.

The constituent material of the second semiconductor layer 120 is not limited to a particular type, and may be identical to or different from the constituent material of the first semiconductor layer.

The first semiconductor layer 110 and the second semiconductor layer 120 basically use silicon (Si), and to increase the phase modulation rate, a material having a smaller effective mass than silicon may be introduced.

The insulating layer 130 is formed between the first semiconductor layer 110 and the second semiconductor layer 120, and serves as dielectrics for a capacitor. The insulating layer 130 includes the ferroelectric layer 131, and ferroelectrics is a property of a certain material to have electric polarization in a natural state, which can be reversed by the electric field, and it is ferroelectric by the spontaneous polarization reversal phenomenon.

In an embodiment, the ferroelectric layer may be made of high-k materials such as $Al_2O_3$, $HfO_2$, $La_2O_3$ and $Y_2O_3$, doped with metal elements to have ferroelectric properties, for example, Y-doped $HfO_2$, Si-doped $HfO_2$, Al-doped $HfO_2$, Sr-doped $HfO_2$, Gd-doped $HfO_2$, La-doped $HfO_2$ and $HfZrO_2$. Additionally, it is possible to have the ferroelectric properties by adjusting the thickness of the high-k material (to make thinner).

As another example, the ferroelectric layer may be made of Perovskite dielectrics such as PZT and $BaTiO_3$, or organics having ferroelectric properties such as PVDF-TrFE, but this is provided for illustration only and the present disclosure is not limited thereto.

Hereinafter, the effect of the introduction of the ferroelectric materials to the semiconductor-insulator-semiconductor (SIS) insulating layer according to embodiments of the present disclosure will be described in detail, compared to a general optical device.

Seeing a general SIS optical phase shifter, when voltage is applied to semiconductor layers of opposite polarities through electrodes, electrical charges accumulate on two sides with respect to a thin dielectric layer (oxide) between the semiconductor layers, and a change in free carrier density causes a change in refractive index of the semiconductor layers, showing a change $\Delta n$ in effective refractive index in the optical mode.

In the change in effective refractive index, according to the Drude model, as the wavelength of light is larger and the effective mass of a material is smaller, a change $\Delta n$ in effective refractive index and a change $\Delta\alpha$ in yield resulting from the free-carrier effects are larger. This correlation between variables can be seen from the following equation 1.

$$\Delta n = -\frac{q^2\lambda^2}{8\pi^2 c^2 \varepsilon_0 n} \left( \frac{\Delta N_e}{m_{ce}^*} + \frac{\Delta N_h}{m_{ch}^*} \right)$$

$$\Delta\alpha = -\frac{q^3\lambda^2}{8\pi^2 c^3 \varepsilon_0 n} \left( \frac{\Delta N_e}{m_{ce}^{*2}\mu_e} + \frac{\Delta N_h}{m_{ch}^{*2}\mu_h} \right)$$

[Equation 1]

Referring to Korean Patent Application No. 10-2017-0117061, this application employs compound semiconductors having a small effective mass $m^*_{ce}$, $m^*_{ch}$, for example, semiconductor materials such as GaSb, InGaSb and InAsSb to increase the phase modulation rate. The present disclosure concentrates on an increase in an amount of collected charge $\Delta N_e$, $\Delta N_h$ that is another variable for increasing the phase modulation rate.

$$\Delta n = -\frac{q^2\lambda^2}{8\pi^2 c^2 \varepsilon_0 n} \left( \frac{\Delta N_e(V)}{m_{ce}^*} + \frac{\Delta N_h(V)}{m_{ch}^*} \right)$$

[Equation 2]

According to the Drude model, as an amount of change $\Delta N_e$, $\Delta N_h$ of carriers and holes, i.e., an amount of charge collected in the semiconductor layer is larger, the refractive index $\Delta n$ increases. To control the variables, ferroelectric materials are introduced to a dielectric layer of the existing SIS optical phase shifter, thereby increasing the charge collection efficiency, and as a consequence, improving the phase modulation efficiency.

For example, when voltage is applied to the positively (+) doped first semiconductor layer (for example, p-Si) and the negatively (−) doped second semiconductor layer (for example, n-Si), a polarization phenomenon occurs in the ferroelectric layer formed between the semiconductors by the electric field. When polarization of ferroelectrics is used in a specific condition, the negative capacitance effect may be obtained, and accordingly, the charge collection efficiency may be improved compared to a structure using an oxide dielectric layer.

Figure 2A:
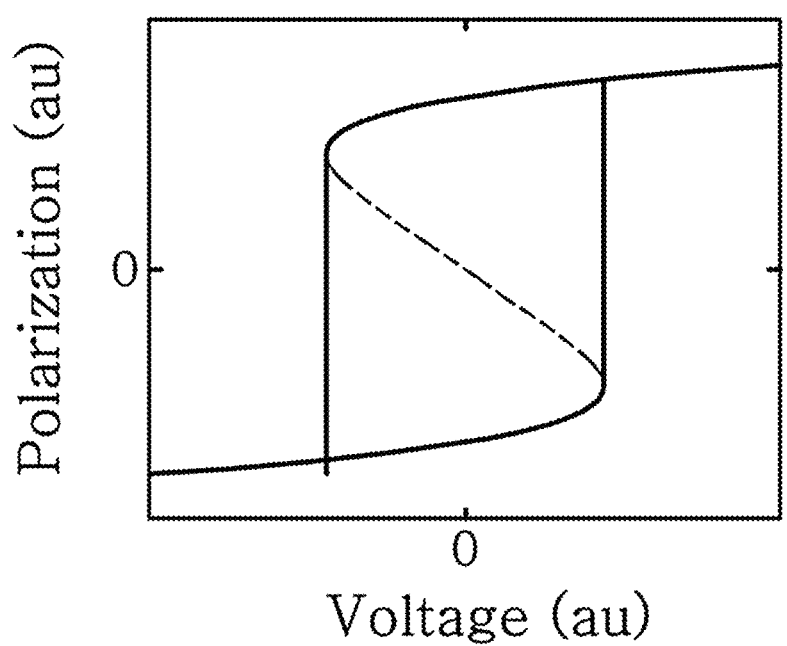
FIG. 2A is a graph showing a PE curve of ferroelectric materials.
Figure 2B:
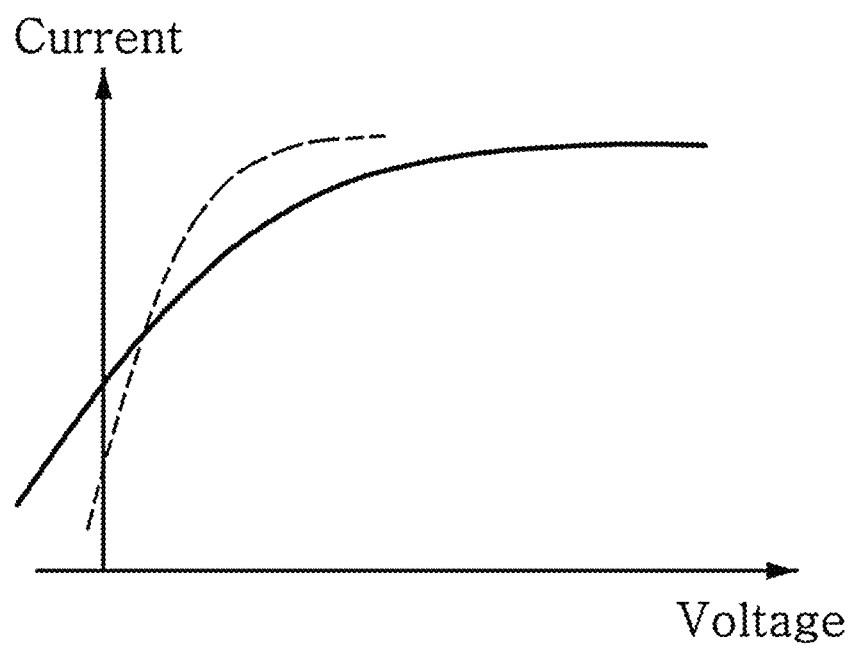
FIG. 2B is a graph showing the current-voltage characteristics of MOSFET.

FIG. 2A shows a PE curve of ferroelectric materials. As shown, the negative capacitance effect in which capacitance can be negative (−) occurs in a specific condition. FIG. 2B is a graph showing the current-voltage characteristics of MOSFET, in which the solid line indicates MOSFET using a general oxide dielectric layer, and the dotted line indicates MOSFET adopting ferroelectric materials. As shown, the negative capacitance effect may be obtained using the ferroelectric material properties, and accordingly, it can be seen that sharper (i.e., better) switch characteristics appear. From this, it can be inferred that an SIS optical phase shifter may obtain the negative capacitance effect using ferroelectrics, leading to lower power consumption and higher efficiency.

Figure 3A:
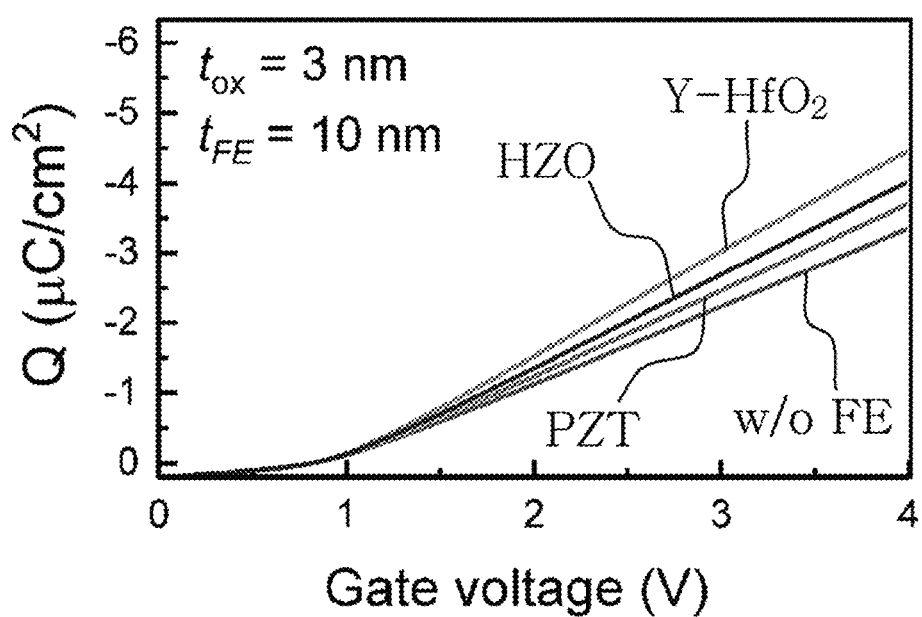
FIGS. 3A to 3C are graphs showing an amount of charge as a function of gate voltage in an SIS structure without ferroelectrics (w/o FE) and SIS structures using each ferroelectrics (Y—$HfO_2$, PZT, HZO).
Figure 3B:
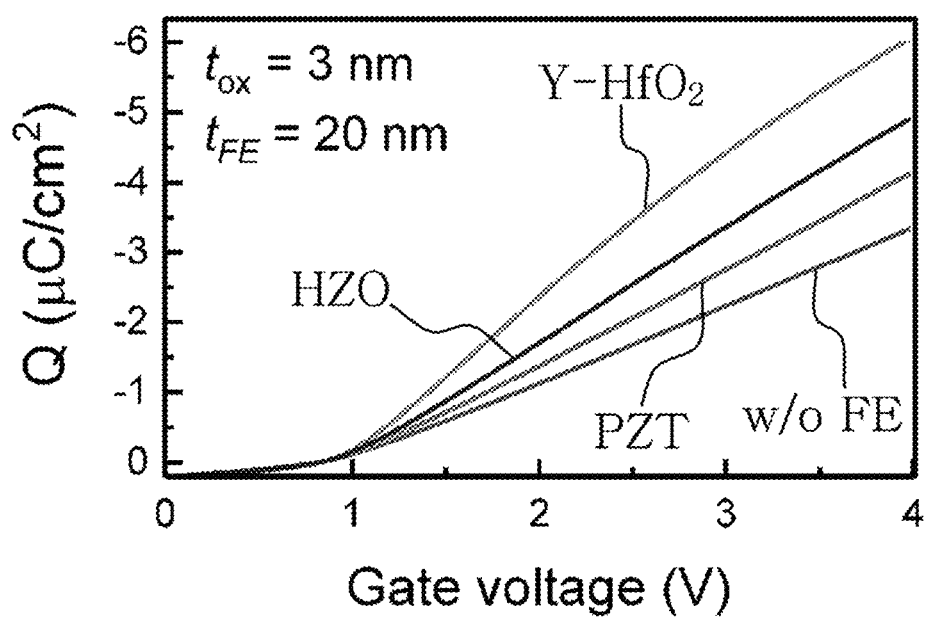
Figure 3C:
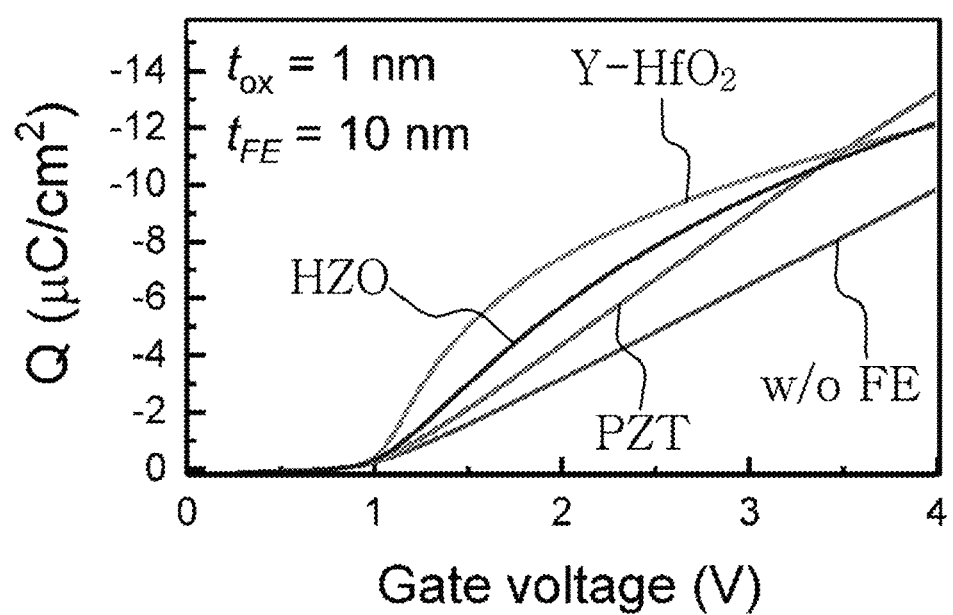

FIGS. 3A to 3C are graphs showing an amount of charge as a function of gate voltage in each case in which an SIS structure does not use ferroelectrics (w/o FE) and SIS structures use each ferroelectrics (Y—HfO$_2$, PZT, HZO). $t_{FE}$ denotes the thickness of a ferroelectric layer, and $t_{ox}$ denotes the thickness of an oxide layer formed between a ferroelectric layer and a semiconductor layer. As can be seen from FIGS. 3A to 3C, when ferroelectrics is used, the charge collection efficiency is found higher. The type and thickness of oxide (paraelectrics) may determine an amount of accumulated charge according to the applied voltage, and have critical influence on capacitance matching for obtaining the negative capacitance effect of ferroelectrics.

Figure 4:
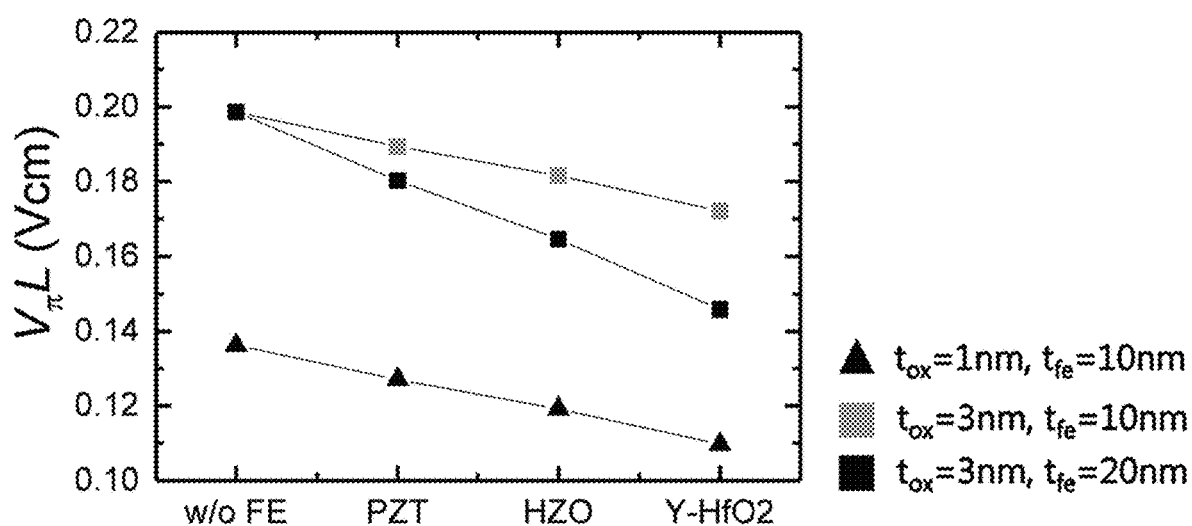
FIG. 4 is a graph showing optical phase modulation efficiency in an SIS structure without ferroelectrics (w/o FE) and SIS structures using each ferroelectrics (Y—$HfO_2$, PZT, HZO).

The graph of FIG. 4 shows improved efficiency of the optical phase shifter according to an embodiment. In FIG. 4, $V_\pi L$ denotes the multiplication of the length L of the optical phase shifter and voltage $V_\pi$ required to change the phase of light as much as $\pi$, and as its value is lower, the length of the modulator required for optical phase modulation is shorter, which is advantageous in minimization and requires lower power consumption, and thus it can be said that efficiency of an optical device increases.

It can be seen from the result of FIG. 4 that compared to the non-use of ferroelectrics (w/o FE), when the optical phase shifter uses ferroelectrics such as PZT, HZO and Y—HfO$_2$, the $V_\pi L$ value is lower, and as a consequence, the optical phase modulation efficiency is improved.

The structures or the values of variables described through the above embodiment are provided for illustration only, and lower power consumption and higher charge collection efficiency may be achieved by optimizing the type of the ferroelectric material, the thickness of the ferroelectric layer and the thickness of the paraelectric layer. Generally, the thickness of the insulating layer is smaller than the thickness of the first semiconductor layer and the second semiconductor layer, and may determine the intensity of focused light.

In an embodiment, it is possible to realize an SIS optical memory device using the memory effect of ferroelectrics. It is possible to realize through design changes of the structural variables in a similar structure to the optical phase shifter. That is, it is possible to realize new properties by changing the variables such as the type of the ferroelectric material, the thickness of the ferroelectric layer and the thickness of the oxide layer.

Referring to FIG. 1, the insulating layer 130 may include the ferroelectric layer 131 and the paraelectric layers 132, 133, and a ratio between ferroelectrics and paraelectrics included in the insulating layer may determine the present or absence of hysteresis in the electrical properties of the optical phase interferometer.

Figure 5:
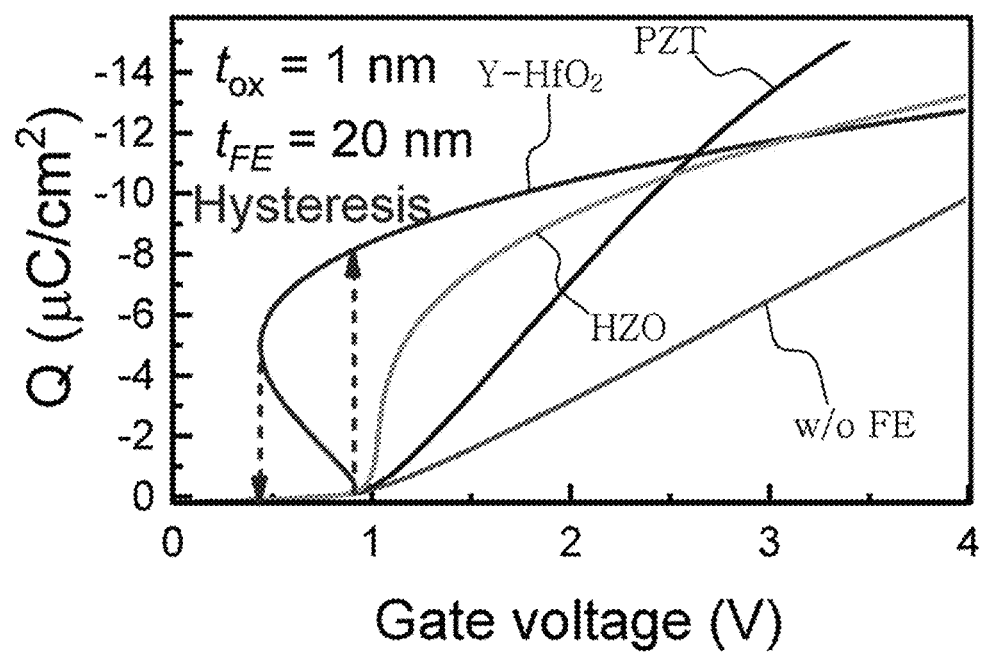
FIG. 5 is a graph showing an amount of charge as a function of gate voltage in an optical device exhibiting memory characteristics when using ferroelectrics (Y—$HfO_2$) according to an embodiment.

For example, when an SIS optical switch is designed such that a ferroelectric material is Y—HfO$_2$, a ferroelectric layer is 20 nm or more thick, and an oxide layer formed between the ferroelectric layer and a semiconductor layer is about 1 nm thick, the hysteresis characteristics appear as shown in FIG. 5. Using such physical properties of ferroelectrics, a light output port is maintained after switching, and it can be used as a memory and a switch.

In other words, the negative capacitance effect or the memory effect may appear according to the design of the structural variables. The values are provided for illustration only, and an optical device having various characteristics and performance may be realized using appropriate ferroelectric materials and structures. Particularly, capacitance matching of semiconductor and paraelectrics (oxide)-ferroelectrics is important for the negative capacitance effect.

Meanwhile, when light is confined in the device, the mode is divided into a TE mode in which light is confined in semiconductors of two polarities and a slot mode in which light is confined in dielectrics according to the thickness of dielectrics. In the TE mode, an optical phase shifter, an optical switch and a memory used commonly in silicon photonics can be manufactured, and in the slot mode, the nonlinear optical effect of ferroelectrics can be seen.

To effectively realize these functions, in the design of an optical device, the electrical properties of the device and interaction with light should be considered. For the electrical properties, charge accumulated in the ferroelectric SIS structure may be calculated by combining TOAD simulation with Landau-Khalatnikov (L-K) equation used for theory calculation of ferroelectrics. For interaction with light, it can be calculated by determining the mode confinement of light using the Finite Difference Eigenmode (FDE) solver, and combining with the electrical properties.

In an embodiment, it is possible to realize an optical interferometer including the optical phase shifter. For example, the optical interferometer includes an optical structure having a phase shifter as its component, such as a Mach-Zehnder interferometer, a ring resonator, and a Fabry-Perot (FP) resonator.

Figure 6A:
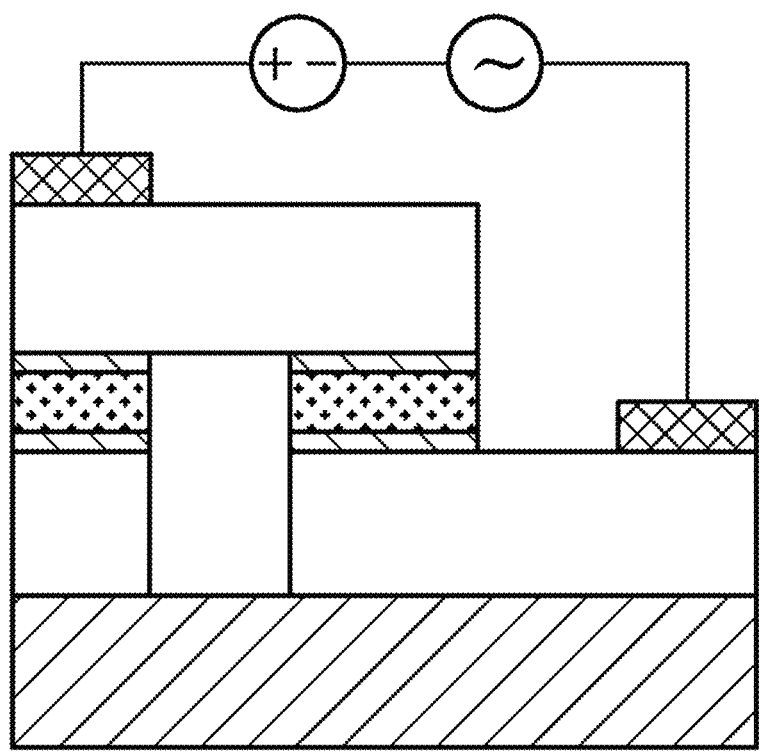
FIGS. 6A to 6C are diagrams showing various structures of an optical phase shifter according to an embodiment.
Figure 6B:
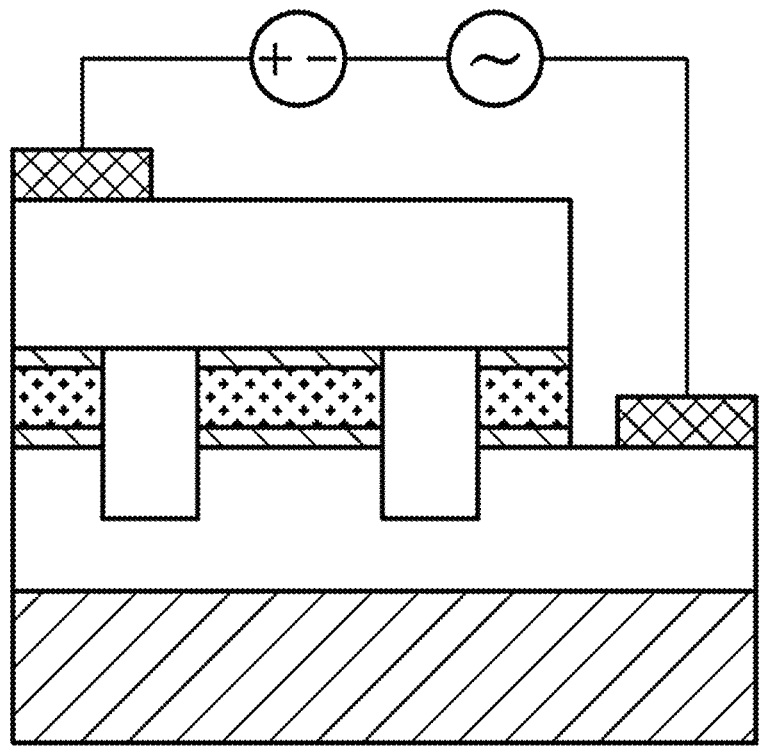
Figure 6C:
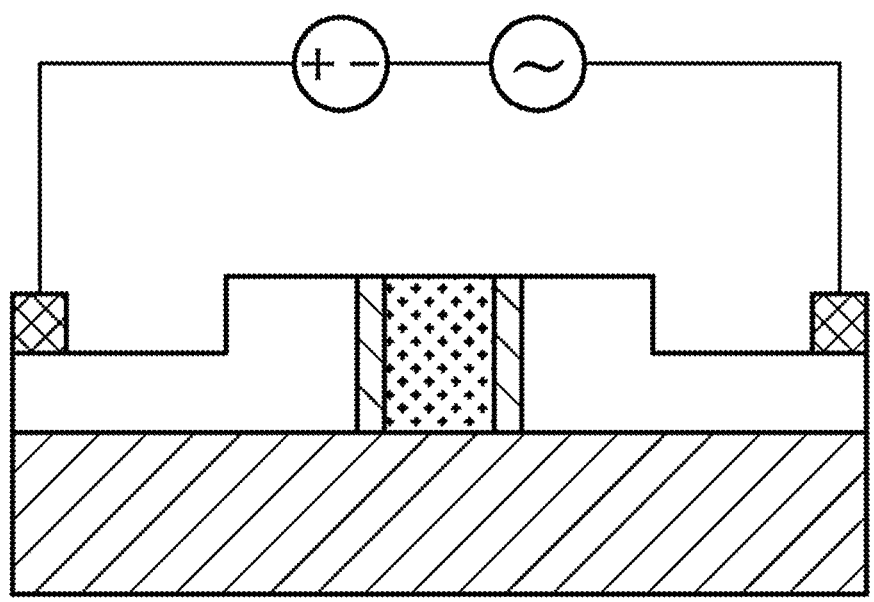

FIGS. 6A to 6C are diagrams showing various structures of the optical phase shifter according to an embodiment. FIGS. 6A, 6B and 6C have a structure of <first semiconductor layer-paraelectric layer-ferroelectric layer-paraelectric layer-second semiconductor layer> in common. As described above, the type, thickness and order of the ferroelectrics and the paraelectrics may be differently set according to the purpose of use of an optical device.

According to the embodiments described hereinabove, it is possible to improve performance and reduce power consumption of a light modulator and an optical switch in the Near-IR wavelength range (particularly, 1.55, 1.3 um wavelength range) and Mid-IR wavelength range by using the negative capacitance (NC) effect of ferroelectric materials. Additionally, it is possible to realize an optical memory device by using the hysteresis characteristics of ferroelectrics, or an electric field effect modulator or a switch using polarization of ferroelectrics. Accordingly, it is possible to dramatically improve the performance of the existing silicon photonics and present a universe platform.

In another embodiment, ferroelectrics may be included in the insulating layer as well as a separate capacitor connected to the electrode. In this case, the optical phase shifter may further include a circuit for charging the capacitor.

For example, there may be provided a hybrid structure of an optical phase shifter with a ferroelectric capacitor, including: a first semiconductor layer formed on a substrate; a second semiconductor layer having the opposite polarity to the first semiconductor layer; an insulating layer formed between the first semiconductor layer and the second semiconductor layer; an electrode connected to each semiconductor layer; a capacitor connected to the electrodes and including ferroelectrics; and a circuit for charging the capacitor.

Hereinafter, a method for manufacturing an optical phase shifter will be described with reference to the drawings.

An SIS structure using wafer bonding is described as an embodiment. As shown in FIGS. 7A to 7E, an SIS capacitor may be formed by forming a ferroelectric layer and an oxide layer between semiconductors of opposite polarities, and bonding the two semiconductors using the ferroelectric materials as bonding surfaces. According to this method, it is possible to integrate semiconductors having high PDE such as group III-V semiconductors, thereby improving the efficiency of the optical phase shifter. A detailed manufacturing method is as follows.

Figure 7A:
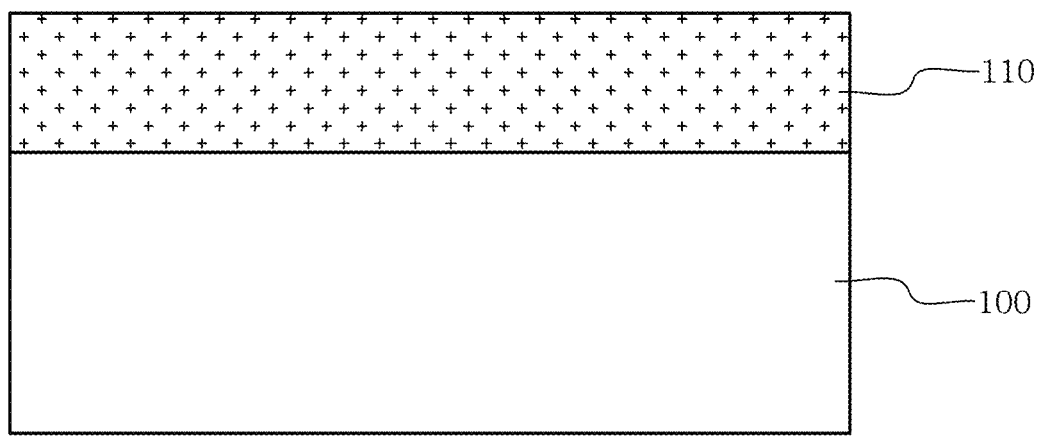

FIG. 7A: First, a first semiconductor layer 110 is formed on a substrate 100.

Figure 7B:
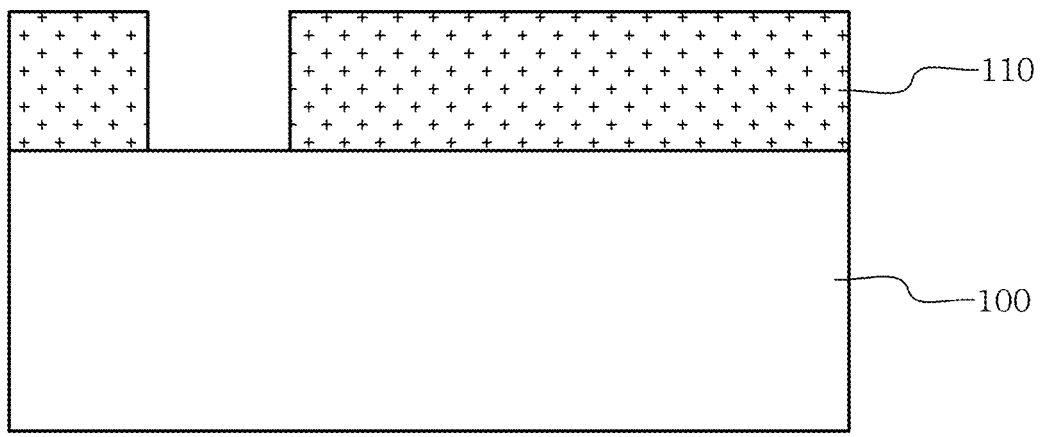

FIG. 7B: Subsequently, the first semiconductor layer 110 is processed to form an optical waveguide.

FIG. 7C: Ferroelectric layers 130, 130' and paraelectric layers 132, 133 are formed on the first semiconductor layer 110 and a second semiconductor layer 120 having the opposite polarity to the first semiconductor layer 110, respectively.

Figure 7D:
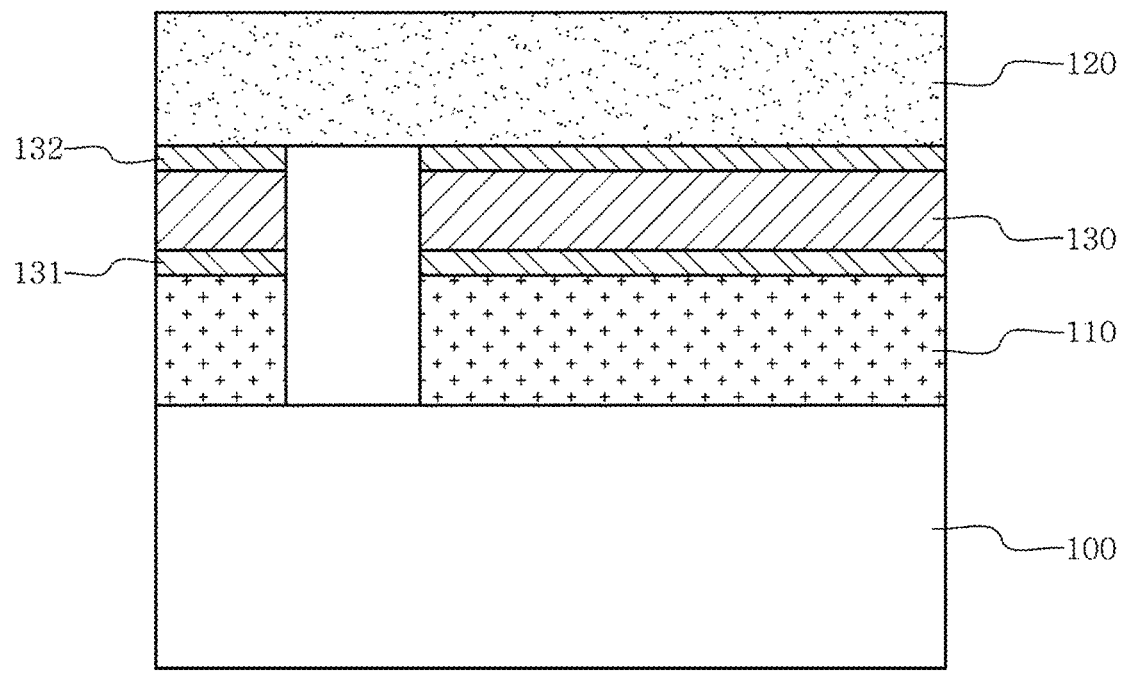

FIG. 7D: The ferroelectric layer 130 of the first semiconductor layer 110 and the ferroelectric layer 130' of the second semiconductor layer 120 are bonded together as bonding surfaces.

Figure 7E:
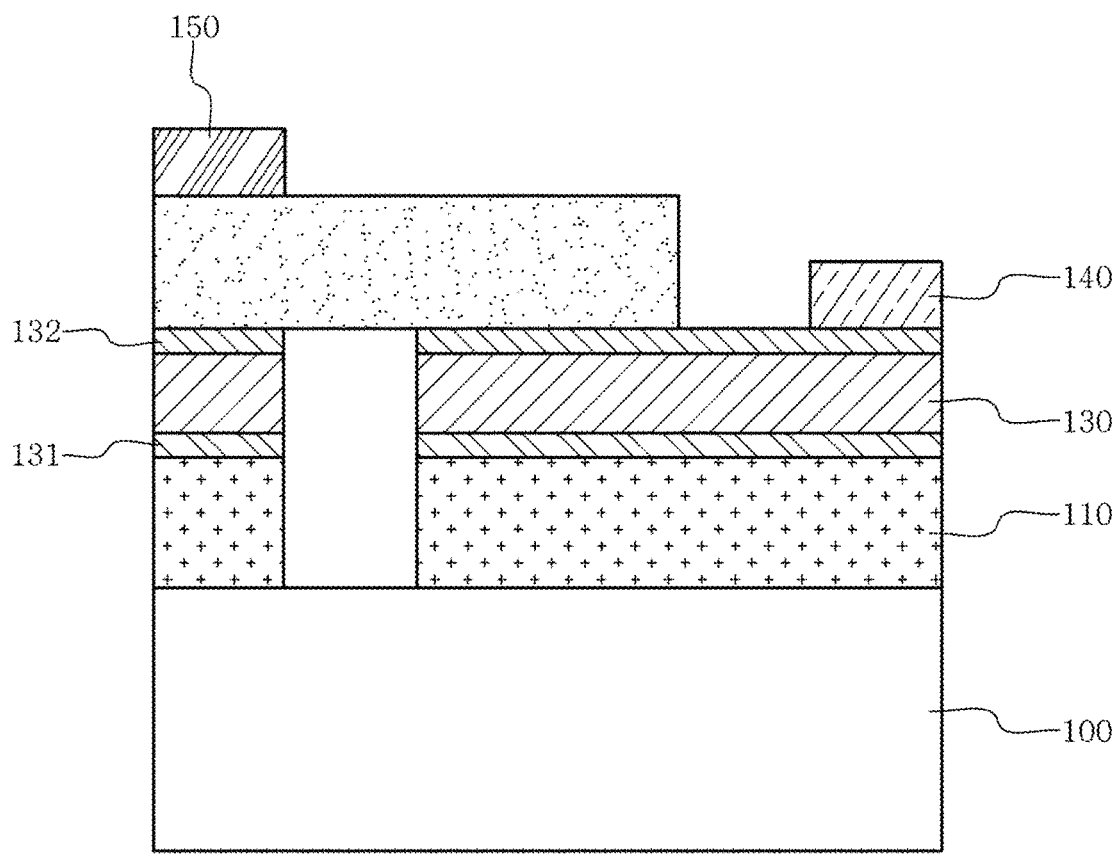

FIG. 7E: The second semiconductor layer 120 is processed to form a hybrid structure of the optical waveguide with a taper causing light to travel from the optical waveguide of the first semiconductor layer 110 to the second semiconductor layer 120. Subsequently, an upper cladding and electrodes 140, 150 are formed on each semiconductor layer to manufacture an optical phase shifter.

The structure of the taper causing light to travel from the optical waveguide of the first semiconductor layer to the second semiconductor layer is as shown in FIG. 9. Accordingly, light present in the first layer may be sent to the second layer. In FIG. 9, light can travel from A to B or from B to A, and this is a structure that reversibly changes according to a direction in which light travels.

Figure 8A:
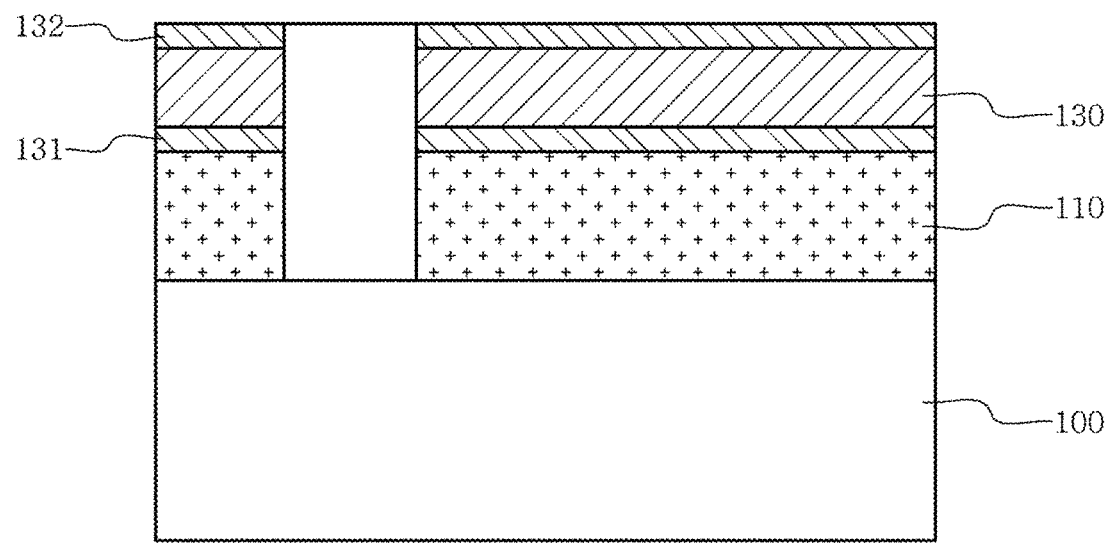
FIGS. 8A and 8B are diagrams showing a method for manufacturing an optical phase shifter according to another embodiment.
Figure 8B:
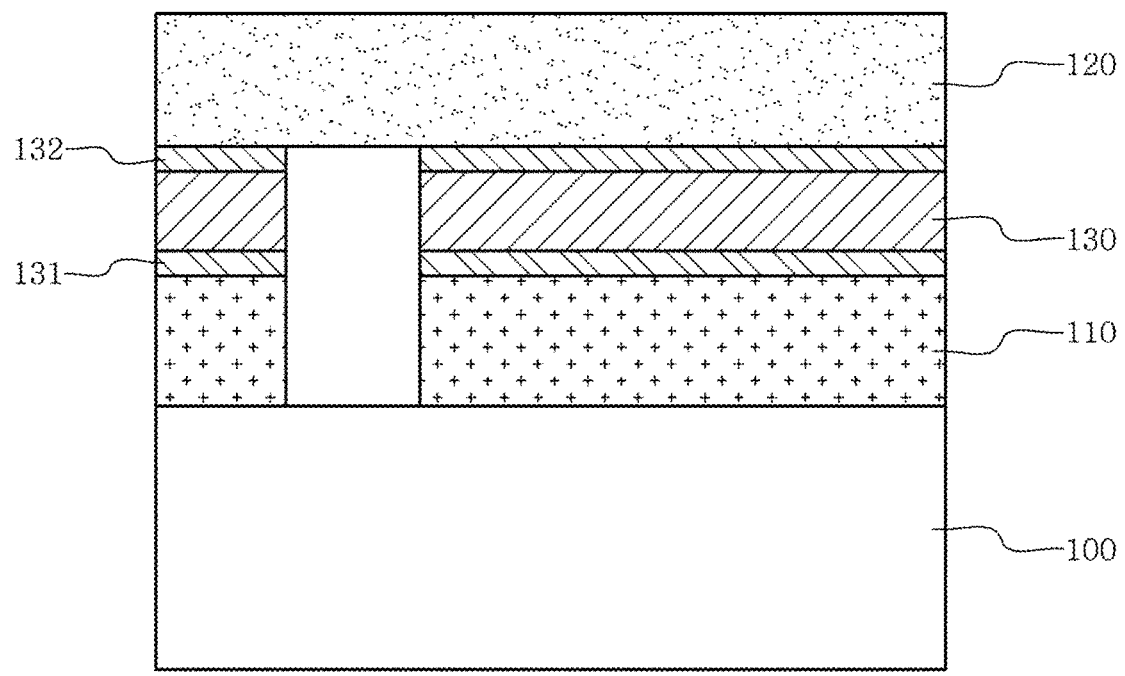

A silicon-insulator-silicon (SIS) structure using a polycrystalline silicon electrode is described as another embodiment. As shown in FIGS. 8A and 8B, a ferroelectric layer and an oxide layer are formed on a silicon-on-insulator (SOI) substrate, and polycrystalline silicon is deposited, forming a final structure.

Referring to FIG. 8A, a first semiconductor layer 110 is formed on a substrate 100, and is processed to form an optical waveguide. Subsequently, a paraelectric layer 131, a ferroelectric layer 130 and a paraelectric layer 132 are formed on the first semiconductor layer in a sequential order.

Subsequently, as shown in FIG. 8B, a second semiconductor layer 120 having the opposite polarity to the first semiconductor layer is formed on the paraelectric layer 132.

In the next step, similar to FIG. 7E, the second semiconductor layer 120 is processed to form a hybrid structure of the optical waveguide with a taper causing light to travel from the optical waveguide of the first semiconductor layer to the second semiconductor, and an upper cladding and electrodes 140, 150 are formed on the first semiconductor layer and the second semiconductor layer to manufacture an optical phase shifter.

In another embodiment, the ferroelectrics may be included in the insulating layer as well as a separate capacitor connected to the electrode. To implement this, after the step of FIG. 7E, the step of connecting a capacitor including the ferroelectrics to the electrodes 140, 150, and the step of connecting a circuit for charging the capacitor may be further performed.

As described above, the type and thickness of ferroelectrics and paraelectrics may determine an amount of accumulated charge according to the applied voltage, and have critical influence on the capacitance matching for obtaining the negative capacitance effect of ferroelectrics. The manufacturing method shows an exemplary process for constructing a common structure of the optical phase shifter or the optical memory device of the present disclosure, and as described above, the structural variables may be changed or the process may be added/excluded according to the purpose.

While the present disclosure has been hereinabove described with reference to the embodiments shown in the drawings, this is provided for illustration purposes only and it will be appreciated by those having ordinary skill in the technical field pertaining to the present disclosure that various modifications and variations may be made thereto. However, it should be noted that such modifications fall within the technical protection scope of the present disclosure. Therefore, the true technical protection scope of the present disclosure should be defined by the technical spirit of the appended claims.

What is claimed is:

1. An optical phase shifter comprising:
a first semiconductor layer formed on a substrate;
a second semiconductor layer having opposite polarity to the first semiconductor layer;
an insulating layer including a ferroelectric layer and at least one paraelectric layer, the insulating layer disposed between the first semiconductor layer and the second semiconductor layer;
a first electrode connected to the first semiconductor layer; and
a second electrode connected to the second semiconductor layer,
wherein a thickness ratio between the ferroelectric layer and the at least one paraelectric layer determines the presence or absence of hysteresis in electrical properties of an optical phase interferometer, or determines charge collection efficiency.

2. The optical phase shifter according to claim 1, wherein the ferroelectric layer includes at least one of a material with high permittivity (high-k materials) doped with a metal element and an adjusted thickness to have ferroelectric properties, Perovskite dielectrics, or organics having ferroelectric properties.

3. The optical phase shifter according to claim 1, wherein the ferroelectric layer includes a metal element-doped $HfO_2$ selected from at least one of Y-doped $HfO_2$, Si-doped $HfO_2$, Al-doped HfO$_2$, Sr-doped HfO$_2$, Gd-doped HfO$_2$, La-doped HfO$_2$ or HfZrO$_2$, or a Perovskite dielectric of at least one of PZT or BaTiO$_3$.

4. The optical phase shifter according to claim 1, wherein the at least one paraelectric layer includes a paraelectric layer proximate to the first semiconductor layer.

5. The optical phase shifter according to claim 4, wherein the insulating layer further includes a paraelectric layer proximate to the second semiconductor layer.

6. The optical phase shifter according to claim 1, wherein thickness of the insulating layer is smaller than thickness of the first semiconductor layer and the second semiconductor layer, and determines an intensity of focused light.

7. An optical interferometer comprising the optical phase shifter according to claim 1.

8. The optical phase shifter according to claim 1, wherein the ferroelectric material comprises the metal element-doped HfO$_2$.

9. The optical phase shifter according to claim 1, further comprising a capacitor that is connected to the first electrode and includes a ferroelectric material, and a capacitor that is connected to the second electrode and includes a ferroelectric material.

10. A semiconductor-insulator-semiconductor (SIS) optical phase shifter comprising:
    a first semiconductor layer formed on a substrate;
    a second semiconductor layer having opposite polarity to the first semiconductor layer, and including a taper such that light can travel from the first semiconductor layer to the second semiconductor layer;
    an insulating layer formed between the first semiconductor layer and the second semiconductor layer, including a ferroelectric layer and at least one paraelectric layer;
    a first electrode connected to the first semiconductor layer;
    a second electrode connected to the second semiconductor layer;
    a capacitor including a ferroelectric material that is connected to the first electrode or the second electrode; and
    a circuit for charging the capacitor, wherein the optical phase shifter has a hybrid structure,
    wherein a thickness ratio between the ferroelectric layer and the at least one paraelectric layer determines the presence or absence of hysteresis in electrical properties of an optical phase interferometer, or determines charge collection efficiency.

11. The optical phase shifter according to claim 10, wherein the ferroelectric material includes at least one of material with high permittivity (high-k materials) doped with a metal element or having an adjusted thickness to have ferroelectric properties, Perovskite dielectrics, and organics having ferroelectric properties.

12. The optical phase shifter according to claim 11, wherein the ferroelectric material comprises a metal element-doped HfO$_2$ selected from Y-doped HfO$_2$, Si-doped HfO$_2$, Al-doped HfO$_2$, Sr-doped HfO$_2$, Gd-doped HfO$_2$, La-doped HfO$_2$ or HfZrO$_2$, or
    the ferroelectric material comprises at least one of PZT, BaTiO$_3$ or PVDF-TrFE.

* * * * *